United States Patent
Jetha et al.

(10) Patent No.: US 9,400,586 B2
(45) Date of Patent: *Jul. 26, 2016

(54) GRAPHICAL USER INTERFACE HAVING AN ATTACHED TOOLBAR FOR DRAG AND DROP EDITING IN DETAIL-IN-CONTEXT LENS PRESENTATIONS

(75) Inventors: Zeenat Jetha, N. Vancouver (CA); David Baar, Vancouver (CA); Andrew Carlisle, Vancouver (CA); Maria Lantin, Vancouver (CA)

(73) Assignee: Callahan Cellular L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,981

(22) Filed: Jun. 25, 2012

(65) Prior Publication Data
US 2012/0278746 A1    Nov. 1, 2012

Related U.S. Application Data

(63) Continuation of application No. 12/340,512, filed on Dec. 19, 2008, now Pat. No. 8,225,225, which is a continuation of application No. 10/619,555, filed on Jul. 16, 2003, now Pat. No. 7,472,354.

(30) Foreign Application Priority Data

Jul. 17, 2002    (CA) .................................... 2393887

(51) Int. Cl.
*G06F 3/048*    (2013.01)
*G06F 3/0481*   (2013.01)
(Continued)

(52) U.S. Cl.
CPC ............ *G06F 3/0481* (2013.01); *G06F 3/0488* (2013.01); *G06F 3/04842* (2013.01); *G06F 3/04883* (2013.01); *G06F 2203/04806* (2013.01)

(58) Field of Classification Search
CPC . G06F 3/0481; G06F 3/0488; G06F 3/04883; G06F 3/04842; G06F 2203/04806
USPC .................................. 715/769, 770, 797–801
See application file for complete search history.

(56) References Cited

U.S. PATENT DOCUMENTS

| 3,201,546 A | 8/1965 | Richardson |
| 3,704,938 A | 12/1972 | Fanselow |

(Continued)

FOREIGN PATENT DOCUMENTS

| CA | 2350342 | 11/2002 |
| CA | 2386560 | 11/2003 |

(Continued)

OTHER PUBLICATIONS

"Non Final Office Action", U.S. Appl. No. 11/159,205, (Jul. 27, 2009),13 pages.

(Continued)

*Primary Examiner* — Tuyetlien T Tran
(74) *Attorney, Agent, or Firm* — McAndrews, Held & Malloy, Ltd.

(57) ABSTRACT

Detail-in-context techniques are described. In an implementation, an original image is distorted to produce a distorted region for a selected object at a first position in an original image displayed on a display screen. The distorted region magnifies at least a portion of the object. A signal is received to drag the object and the distorted region from the first position to a second position. A signal is received to drop the object at the second position. The distorted region is removed from the original image after the object is dropped at the second position.

8 Claims, 12 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 3,739,739 A | 6/1973 | Brase |
| 3,762,799 A | 10/1973 | Shapiro |
| 4,581,647 A | 4/1986 | Vye |
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |
| 4,970,028 A | 11/1990 | Kenyon et al. |
| 4,985,849 A | 1/1991 | Hideaki |
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |
| 5,185,599 A | 2/1993 | Dorrnink et al. |
| 5,185,667 A | 2/1993 | Zimmermann |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A * | 6/1997 | Mullet et al. .................. 715/855 |
| 5,644,758 A | 7/1997 | Patrick |
| 5,651,107 A | 7/1997 | Frank et al. |
| 5,652,851 A | 7/1997 | Stone et al. |
| 5,657,246 A | 8/1997 | Hogan et al. |
| 5,670,984 A | 9/1997 | Robertson et al. |
| 5,680,524 A | 10/1997 | Maples et al. |
| 5,682,489 A | 10/1997 | Harrow et al. |
| 5,689,287 A | 11/1997 | Mackinlay et al. |
| 5,689,628 A | 11/1997 | Robertson |
| 5,721,853 A | 2/1998 | Smith |
| 5,729,673 A | 3/1998 | Cooper et al. |
| 5,729,704 A * | 3/1998 | Stone et al. .................. 715/804 |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver et al. |
| 6,133,914 A | 10/2000 | Rogers et al. |
| 6,147,709 A | 11/2000 | Martin et al. |
| 6,154,840 A | 11/2000 | Pebley et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,252,596 B1 * | 6/2001 | Garland .................. 715/810 |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |

(56) References Cited

U.S. PATENT DOCUMENTS

| | | |
|---|---|---|
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfield |
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Koichiro |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar |
| 7,714,859 B2 | 5/2010 | Shoemaker |
| 7,737,976 B2 | 6/2010 | Lantin |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han, II |
| 2002/0033837 A1 | 3/2002 | Munro |
| 2002/0038257 A1 | 3/2002 | Joseph et al. |
| 2002/0044154 A1* | 4/2002 | Baar et al. .................... 345/660 |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0061211 A1 | 3/2003 | Shultz et al. |
| 2003/0100326 A1 | 5/2003 | Grube et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1* | 11/2003 | Ellis et al. .................... 345/838 |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2007/0288860 A1* | 12/2007 | Ording et al. ................. 715/779 |
| 2009/0141044 A1 | 6/2009 | Shoemaker |
| 2009/0147023 A1 | 6/2009 | Jetha et al. |
| 2009/0172587 A1 | 7/2009 | Carlisle |
| 2010/0026718 A1 | 2/2010 | Jetha |
| 2010/0033503 A1 | 2/2010 | Baar |
| 2010/0045702 A1 | 2/2010 | Doyle |
| 2010/0192062 A1* | 7/2010 | Anwar .......................... 715/702 |
| 2010/0262907 A1 | 10/2010 | Shoemaker et al. |

FOREIGN PATENT DOCUMENTS

| | | |
|---|---|---|
| CA | 2393708 | 1/2004 |
| CA | 2394119 | 1/2004 |
| EP | 0635779 | 1/1995 |

(56) References Cited

FOREIGN PATENT DOCUMENTS

| EP | 0650144 | 4/1995 |
|---|---|---|
| EP | 0816983 | 1/1998 |
| EP | 0816983 | 7/1998 |
| JP | 4410465 | 2/2010 |

OTHER PUBLICATIONS

"Advisory Action", U.S. Appl. No. 11/249,493, (Aug. 11, 2009),5 pages.
"Advisory Action", U.S. Appl. No. 10/705,199, (Aug. 18, 2009),5 pages.
"Restriction Requirement", U.S. Appl. No. 11/935,222, (Aug. 20, 2009),6 pages.
"Advisory Action", U.S. Appl. No. 11/249,493, (Sep. 14, 2009),4 pages.
"Non-Final Office Action", U.S. Appl. No. 12/364,450, (Sep. 30, 2009), 10 pages.
"Notice of Allowance", U.S. Appl. No. 10/358,394, (Oct. 8, 2009), 7 pages.
"Final Office Action", U.S. Appl. No. 11/935,222, (Nov. 24, 2009), 8 pages.
"Final Office Action", U.S. Appl. No. 11/541,778, (Dec. 4, 2009), 12 pages.
"Notice of Allowance", U.S. Appl. No. 11/214,886, (Dec. 15, 2009), 16 pages.
"BPAI Decision", U.S. Appl. No. 10/682,298, (Dec. 30, 2009),14 pages.
"Notice of Allowance", U.S. Appl. No. 11/410,024, (Jan. 4, 2010), 7 pages.
"Final Office Action", U.S. Appl. No. 11/673,038, (Jan. 8, 2010), 33 pages.
"Advisory Action", U.S. Appl. No. 11/541,778, (Feb. 1, 2010), 3 pages.
"Advisory Action", U.S. Appl. No. 11/935,222, (Feb. 4, 2010), 3 pages.
"Restriction Requirement", U.S. Appl. No. 12/368,263, (Mar. 9, 2010), 7 pages.
"Notice of Allowance", U.S. Appl. No. 10/705,199, (Mar. 10, 2010),18 pages.
"Non Final Office Action", U.S. Appl. No. 11/691,686, (Mar. 18, 2010),17 pages.
"Advisory Action", U.S. Appl. No. 11/673,038, (Mar. 25, 2010), 3 pages.
"Final Office Action", U.S. Appl. No. 11/159,205, (Mar. 25, 2010), 16 pages.
"Notice of Allowance", U.S. Appl. No. 12/364,450, (Apr. 19, 2010), 4 pages.
"Non-Final Office Action", U.S. Appl. No. 11/236,694, (Apr. 20, 2010), 9 pages.
"Non Final Office Action", U.S. Appl. No. 12/368,263, (Apr. 30, 2010), 8 pages.
"Non Final Office Action", U.S. Appl. No. 12/368,267, (Jun. 11, 2010), 12 pages.
"Notice of Allowability", U.S. Appl. No. 12/364,450, (Jun. 18, 2010), 2 pages.
"Non Final Office Action", U.S. Appl. No. 11/541,778, (Jun. 19, 2009),36 pages.
"Non Final Office Action", U.S. Appl. No. 11/673,038, (Jul. 13, 2009),45 pages.
"Non Final Office Action", U.S. Appl. No. 11/410,024, (Jul. 20, 2009),27 pages.
Smith, et al., "Efficient techniques for wide-angle stereo vision using surface projection models", Retrieved from <http://ieee.org/stamp.jsp?arnumber=17045, (1999),6 pages.
"Final Office Action", U.S. Appl. No. 11/691,686, (Nov. 22, 2010), 16 pages.
"Non-Final Office Action", U.S. Appl. No. 11/410,024, (Mar. 11, 2009),35 pages.
"Foreign Office Action", Application Serial No. 2002-536993, (Mar. 11, 2009),2 pages.
"Notice of Allowance", U.S. Appl. No. 11/401,349, (Apr. 17, 2009),35 pages.
Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.
"Non Final Office Action", U.S. Appl. No. 10/705,199, (May 12, 2009),46 pages.
Robertson, et al., ""The Document Lens"", (1993),pp. 101-108.
Carpendale, Marianne Sheelagh T., ""A Framework for Elastic Presentation Space"", *Simon Fraser University*, Burnaby; British Columbia XP001051168; the application figures 2.13, 3.1-3.31, 4.1-4.19, 5.14,(1999),pp. 7, 14, 34, 38, 65, 112, 123, and 126.
"Non Final OA", U.S. Appl. No. 11/935,222, (Feb. 20, 2009),12 pages.
Carpendale, M.S.T et al., ""A Framework for Unifying Presentation Space"", *01UIST. Proceedings of the 14th Annual ACM Symposium on User Interface Software and Technology, Proceedings of UIST '01: ACM Symposium on User Interface Software and Technology*, Orlando, FL, USA; XP002249323 2001, New York, NY, USA, ISBN: 1-58113-438-X,(Nov. 14, 2001),pp. 61-70; p. 64.
Ikedo, T ""A Realtime Video-Image Mapping User Polygon Rendering Techniques"", *IEEE Intl. conf on Ottawa, ONT*, Canada Jun. 3-6, 1997, Los Alamitos, CA, USA; *IEEE Comput. Soc*, US, XP010239181, ISBN: 0-8186-7819-4 Sections 2, 4.4; Multimedia Computing and Systems '97 Proceedings,(Jun. 3, 1997),pp. 127-134.
Bouju, A. et al., ""Client-Server Architecture for Accessing Multimedia and Geographic Databases within Embedded Systems"", *Database and Expert Systems Applications, 1999 Proceedings. Tenth International Workshop on Florence*, Italy Sep. 1-3, 1999, Los Alamitos, CA, USA, *IEEE Comput. Soc*, US, XP010352370; ISBN:0-7695-0281-4, abstract, figure 2,(Sep. 1-3, 1999),pp. 760-764.
Robertson, G et al., "The Document Lens", *UIST. Proceedings of the Annual ACM Symposium on User Interface Software and Technology*. abstract figures 3,4,(Nov. 3, 1993),pp. 101-108.
Dursteler, Juan C., "The digital magazine of InfoVis.net", Retrieved from: http://www.infovis.net/printMag.php?num=85&lang=2;(Apr. 22, 2002).
"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).
Kuederle, Oliver ""Presentation of Image Sequences: A Detail-in-Context Approach"", *Thesis, Simon Fraser University*; (Aug. 2000),pp. 1-3, 5-10, 29-31.
Microsoft Corp., "Microsoft Paint", Microsoft Corp.,(1981-1998),Paint 1-14.
"Electronic Magnifying Glasses", *IBM Technical Disclosure Bulletin, IBM Corp.*, New York, US, vol. 37, No. 3; XP000441501, ISSN: 0018-8689 the whole document; (Mar. 1, 1994),pp. 353-354.
Keahey, T. A., ""The Generalized Detail-In-Context Problem"", *Information Visualization 1998, Proceedings; IEEE Symposium on Research Triangle*, CA, USA; Los Alamitos, CA, USA, *IEEE Comput. Soc*, US; XP010313304; ISBN: 0-8186-9093,(Oct. 19-20, 1998),pp. 44-51, 152.
Carpendale, et al., ""3-Dimensional Pliable Surfaces: For the Effective Presentation of Visual Information"", *Proceedings of the 8th annual ACM symposium on User interface and software technology*; (Dec. 1995).
Carpendale, M S T et al., ""Extending distortion viewing form 2D to 3D"", *IEEE Computer Graphics and Applications, IEEE Inc.* New York, US, vol. 17, No. 4; XP000927815, ISSN: 0272-1716. (Jul. 1997),pp. 42-51.
Viega, J et al., ""3D magic lenses"", *Proceedings of the 9th annual ACM symposium on User interface software and technology; Pub 1996 ACM Press* New York, NY, USA; (1996),51-58.
Cowperthwaite, David J., ""Occlusion Resolution Operators for Three-Dimensional Detail-In-Context"", Burnaby, British Columbia: *Simon Fraser University*; (2000).

(56) References Cited

OTHER PUBLICATIONS

Carpendale, M.S.T. ""A Framework for Elastic Presentation Space"", *Thesis Simon Fraser University*, XP001051168; Chapter 3-5; appendix A,B; (Mar. 1999),pp. 1-271.

Carpendale, M.S.T. et al., ""Exploring Distinct Aspects of the Distortion Viewing Paradigm"", *Technical Report TR 97-08, School of Computer Science, Simon Fraser University*, Burnaby, British Columbia, Canada; (Sep. 1997).

Cowperthwaite, David J., et al., ""Visual Access for 3D Data"", in *Proceedings of ACM CHI 96 Conference on Human Factors in Computer Systems*, vol. 2 of *Short Papers: Alternative Methods of Interaction*; (1996),pp. 175-176.

Keahey, T. A., ""Visualization of High-Dimensional Clusters Using NonLinear Magnification"", *Technical Report LA-UR-98-2776, Los Alamos National Laboratory*; (1998).

Tigges, M. et al., ""Generalized Distance Metrics for Implicit Surface Modeling"", *Proceedings of the Tenth Western Computer Graphics Symposium*; (Mar. 1999).

Bossen, F. J., ""Anisotropic Mesh Generation With Particles"", *Technical Report CMU-CS-96-134, CS Dept, Carnegie Mellon University*; (May 1996).

Bossen, F. J., et al., ""A Pliant Method for Anisotropic Mesh Generation"", *5th Intl. Meshing Roundtable*; (Oct. 1996),pp. 63-74.

Wilson, et al., ""Direct Volume Rendering Via 3D Textures"", *Technical Report UCSC-CRL-94-19, University of California, Santa Cruz, Jack Baskin School of Engineering*; (Jun. 1994).

Carpendale, M.S.T. "A Framework for Elastic Presentation Space", *PhD thesis, Simon Fraser University*; (1999),pp. 69, 72, 78-83,98-100, 240, and 241.

Keahey, T. A., et al., ""Techniques for Non-Linear Magnification Transformations"", *Information Visualization '96, Proceedings IEEE Symposium on, San Francisco, CA, Los Alamitos, CA, USA, IEEE Comput. Soc*, US: XP010201943; ISBN: 0-8186-7668-X the whole document,(Oct. 28, 1996),pp. 38-45.

Carpendale, M. Sheelagh T., et al., ""3-Dimensional Pliable Surfaces: For the Effective Presentation of Visual Information"", *UIST '95, 8th Annual Symposium on User Interface Software and Technology, Proceedings of the ACM Symposium on User Interface Software and Technology*, Pittsburgh, PA, *ACM Symposium on User Interface Software and Technology*, New York, Nov. 14, 1995 (1995-, (Nov. 14-17, 1995),pp. 217-226.

Tominski, Christian et al., ""Fisheye Tree Views and Lenses for Graph Visualization"", pp. 1-8.

Keahey, T. A., ""Getting Along: Composition of Visualization Paradigms"", *Visual Insights, Inc.*; (2001).

Sakamoto, Chikara et al., ""Design and Implementation of a Parallel Pthread Library (PPL) with Parallelism and Portability"", *Systems and Computers in Japan*, New York, US, vol. 29, No. 2; XP000752780, ISSN: 0882-1666 abstract,(Feb. 1, 1998),pp. 28-35.

Deng, K. et al., ""Texture Mapping with a Jacobian-Based Spatially-Variant Filter",", *Proceedings 10th Pacific Conference on Computer Graphics and Applications*, Beijing, China, 2002 Los Alamitos, CA, USA, *IEEE Comput. Soc*, USA; XP00224932, ISBN; 0-7695-1784-6 the whole.document,(Oct. 9-11, 2002),pp. 460-461.

Welsh, Michelle "Futurewave Software", *Business Wire*; (Nov. 15, 1993).

Lamar, et al., "A Magnification Lens for Interactive Volume Visualization", *ACM*; pp. 1-10.

Fitzmaurice, G. et al., ""Tracking Menus"", *UIST*; (2003),pp. 71-79.

Stone, et al., "The movable filter as a user interface tool", *Proceedings of CHI ACM*; (1992),pp. 306-312.

Baudisch, P. et al., ""Halo: a Technique for Visualizing Off-Screen Locations"", *CHI*; (Apr. 5-10, 2003).

Baudisch, P. et al., ""Drag-And-Pop: Techniques for Accessing Remote Screen Content on Touch-And-Pen-Operated Systems"", *Interact '03*, (2003).

Carpendale, M.S.T. et al., ""Making Distortions Comprehensible"", *Visual Languages, Proceedings, 1997 IEEE Symposium on Isle of Capri*, Italy, Sep. 23-26, 1997, Los Alamitos, CA, USA, *IEEE Comput. Soc.*, US, Sep. 23, 1997; XP010250566, ISBN: 0-8186-8144-6,(Sep. 23-26, 1997),pp. 36-45.

Ito, Minoru et al., ""A Three-Level Checkerboard Pattern (TCP) Projection Method for Curved Surface Measurement"", *Pattern Recognition, Pergamon Press Inc.*, Elmsford, N.Y., US vol. 28, No. 1; XP004014030, ISSN 0031-3203,(1995),pp. 27-40.

Keahey, T A., et al., ""Nonlinear Magnification Fields"", *Information Visualization, 1997, Proceedings, IEEE Symposium ON* Phoenix, AZ, USA, Los Alamitos, CA, USA, *IEEE Comput. Soc.*, US; XP010257169; ISBN: 0-8186-8189-6,(Oct. 20-21, 1997),pp. 51-58 and 121.

Rauschenbach, U. ""The Rectangular Fish Eye View as an Efficient Method for the Transmission and Display of Large Images"", *Image Processing, ICIP 99, Proceedings, 1999 International Conference on*, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; (1999),pp. 115-119.

Keahey, T. A., "Nonlinear Magnification", (*Indiana University Computer Science*), (1997).

Watt, et al., "Advanced Animation and Rendering Techniques", (*Addison-Wesley Publishing*), (1992),p. 106-108.

Boots, B. N., "Delauney Triangles: An Alternative Approach to Point Pattern Analysis", *Proc. Assoc. Am. Geogr. 6*, (1974),p. 26-29.

Sheelagh, M. et al., ""Distortion Viewing Techniques for 3-Dimensional Data"", *Information Visualization '96, Proceedings IEEE Symposium on San Francisco*, CA, USA, Los Alamitos, CA, USA, *IEEE Comput. Soc*, US Oct. 28, 1996, XP010201944; ISBN: 0-8186-7668-X,(Oct. 28-29, 1996),pp. 46-53, 119.

Leung, Y. K., et al., ""A Review and Taxonomy of Distortion-Oriented Presentation Techniques"", *ACM Transactions on Computer-Human Interaction, 'Online!* vol. 1, No. 2, XP002252314; Retrieved from the Internet: <URL:http://citeseer.nj.nec.com/ leung94review.html> retrieved on Aug. 21, 2003! the whole document,(Jun. 1994),pp. 126-160.

"Non Final Office Action", U.S. Appl. No. 10/358,394, (Mar. 13, 2009).

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, et al., "Graph Folding: Extending Detail and Context Viewing into a Tool for Subgraph Comparisons", In *Proceedings of Graph Drawing 1995*, Passau, Germany, (1995),pp. 127-139.

Carpendale, M.S.T. "A Framework for Elastic Presentation Space", http://pages.cpsc.ucalgary.ca/~sheelagh/personal/thesis/, (Nov. 19, 1999).

"Non Final Office Action", U.S. Appl. No. 11/542,120, (Jan. 22, 2009),20 pages.

"Non Final Office Action", U.S. Appl. No. 11/541,778, (Sep. 29, 2010), 10 pages.

"Non Final Office Action", U.S. Appl. No. 11/695,104, (Oct. 1, 2010), 9 pages.

"Final Office Action", U.S. Appl. No. 11/159,205, (Oct. 6, 2010), 16 pages.

"Non Final Office Action", U.S. Appl. No. 11/236,694, (Oct. 13, 2010), 16 pages.

Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques. Proceedings of the 20th annual conference on Computer graphics and interactive techniques.*, (1993), pp. 57-64.

(56) References Cited

OTHER PUBLICATIONS

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96* Vancouver, BC Canada, (1996), pp. 383-390.

"Final Office Action", U.S. Appl. No. 12/368,263, (Nov. 5, 2010), 7 pages.

"Final Office Action", U.S. Appl. No. 12/764,724, (Nov. 9, 2010), 21 pages.

\* cited by examiner

GRAPHICAL USER INTERFACE HAVING AN ATTACHED TOOLBAR FOR DRAG AND DROP EDITING IN DETAIL-IN-CONTEXT LENS PRESENTATIONS

RELATED APPLICATIONS

This application claims priority as a continuation of U.S. patent application Ser. No. 12/340,512, filed on Dec. 19, 2008 now U.S. Pat. No. 8,225,225, which is a continuation of U.S. patent application Ser. No. 10/619,555, filed on Jul. 16, 2003 now U.S. Pat. No. 7,472,354, and claims priority to Canadian Patent Application No. 2,393,887, filed Jul. 17, 2002, the disclosures of which are incorporated herein by reference in their entireties.

BACKGROUND

Most modern computer software employs a graphical user interface ("GUI") to convey information to and receive commands from users. A graphical user interface relies on a variety of GUI objects or controls, including icons, toolbars, drop-down menus, text, dialog boxes, buttons, and the like. In such GUI systems, toolbars provide an effective way to display numerous computer commands or controls. Toolbars usually include buttons, which are arranged in one or more rows or columns. Each button is associated with a command, and is identified by an icon that represents or depicts that command. For example, the "print" command may be invoked by clicking on a button whose icon depicts a printer. Advantageously, a user can invoke commands on the toolbar by clicking once on the associated button. In addition to buttons, toolbars can also include other interactive controls, such as text boxes, combo boxes, etc. Some toolbars can be turned on or off, and can be oriented horizontally or vertically. Although most toolbars are visually attached to a window, some may float above a window. In some programs that employ toolbars, the toolbars can be modified by adding or deleting controls, or by changing the function associated with a control. This allows the user to customize a toolbar so that the toolbar provides convenient access to the commands that are most frequently used by the user. In addition, these programs support multiple toolbars that can be turned on and off, thereby providing the user with the option of viewing two or more toolbars simultaneously. In some conventional systems, the process of customizing or manipulating toolbars uses a dialog box that displays a list of commands available for the toolbar. The dialog box also can display a list of available toolbars that can be displayed for the application. The user can then customize the toolbar by selecting which controls the user wants displayed.

Now, a user typically interacts with a GUI by using a pointing device (e.g., a mouse) to position a pointer or cursor over an object and "clicking" on the object. For example, a drag and drop ("DAD") operation may be initiated by selection from a toolbar or by selecting an object within a digital image. In a typical DAD operation, a pointing device is used to select an object (e.g. text, icons, graphical objects, etc.) under a cursor and then "drag" the selected object to a different location or orientation on a display screen. The user may then "drop" or release the object at a desired new location or orientation indicated by the position of the cursor. Selecting is usually a first step, generally initiated by holding down a button associated with the pointing device (e.g., a mouse button) and gesturing with the pointing device to indicate the bounds of the object to be selected (as in text selection), or simply by "clicking" on the object under the cursor (as in graphical image or icon selection). Selection is typically indicated by a change in the visual display of the selected object (e.g., by using reverse video, displaying a frame around the object, displaying selection handles around the object, etc.). Dragging is usually a separate step distinct from selection, and is usually initiated by clicking on a selected object and holding a control button down (e.g., holding a mouse button in a depressed state). The object is then dragged while holding the control button. However, in some applications, initiating dragging also selects the object under the cursor. The operation is completed by dropping the selected object.

For many applications, a drag operation may be used to initiate several possible functions relative to an object. For example, in a text application, a selected section of text may be moved or copied by a drag operation. Normally, if multiple functions are possible, one such function (e.g., moving) is a "default" function of a drag operation, while the other functions must be selected by some combination of modifiers (e.g., pressing keys like "SHIFT", "ALT", and "CTRL") while operating the pointing device. In some applications, after completing the drag operation, a menu automatically pops up to allow a user to choose a specific "drop" function. In other applications, such as that described in U.S. Pat. No. 6,246,411 to Strauss, a user may select among multiple functions during a drag operation using a toolbar, thus allowing the user to change a gesture after it has begun.

One problem with present DAD methods such as that described by Strauss is that a user may have difficulty selecting the object to be dragged or the location where that object is to be dropped. Thus, a user may have to repeat the DAD operation several times in order to achieve the desired result. In other words, while present DAD methods may provide a user with a desired image after several iterations, these methods do not provide for the accurate selection and positioning of the desired object at the outset. Thus, and especially for large image presentations such as digital maps, a user may have to repeat the DAD operation several times in order to accurately select or position the desired object. For example, while a user may use well-known "panning" and "zooming" tools to view a desired object in an original image in order to reposition that object, in doing so, the relative location of the new position for that object may be lost to the user or the user may find it difficult to determine what portion of the original image is being observed. Thus, while the user may have gained a detailed view of a region of the original image that is of interest, the user may lose sight of the context within which that region is positioned. This is an example of what is often referred to as a "screen real estate problem".

SUMMARY

Detail-in-context techniques are described. In an implementation, an original image is distorted to produce a distorted region for a selected object at a first position in an original image displayed on a display screen. The distorted region magnifies at least a portion of the object. A signal is received to drag the object and the distorted region from the first position to a second position. A signal is received to drop the object at the second position. The distorted region is removed from the original image after the object is dropped at the second position.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION

Figure 1:
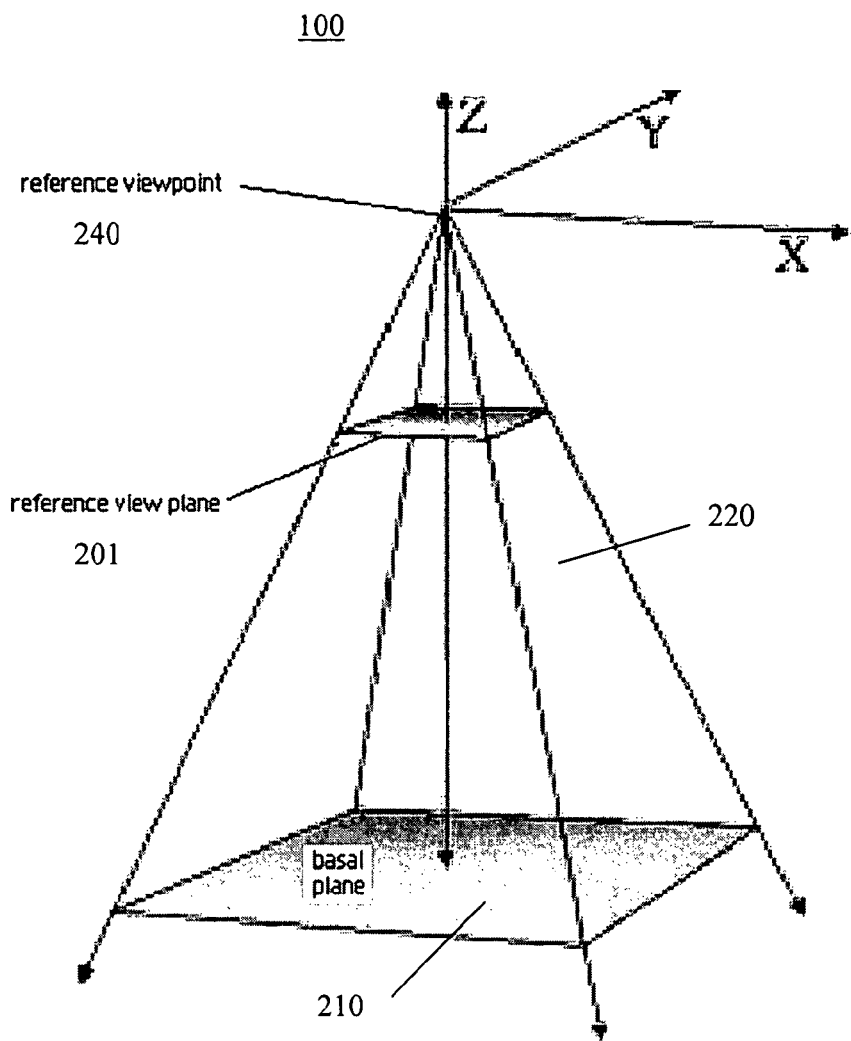
FIG. 1 is a graphical representation of the geometry for constructing a three-dimensional (3D) perspective viewing frustum, relative to an x, y, z coordinate system, in accordance with known elastic presentation space graphics technology.

In the following description, numerous specific details are set forth. However, it is understood that techniques described herein may be practiced without these specific details. In other instances, software, circuits, structures and techniques have not been described or shown in detail in order not to obscure the described techniques. The term "data processing system" is used herein to refer to any machine for processing data, including computer systems and network arrangements described herein.

The "screen real estate problem" mentioned above generally arises whenever large amounts of information are to be displayed on a display screen of limited size. As discussed, conventional tools to address this problem include panning and zooming. While these tools are suitable for a large number of visual display applications, they become less effective where sections of the visual information are spatially related, such as in maps, three-dimensional representations, and newspapers, for example. In this type of information display, panning and zooming are not as effective as much of the context of the panned or zoomed display may be hidden.

One solution to this problem is application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., A Framework for Elastic Presentation Space (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e., the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
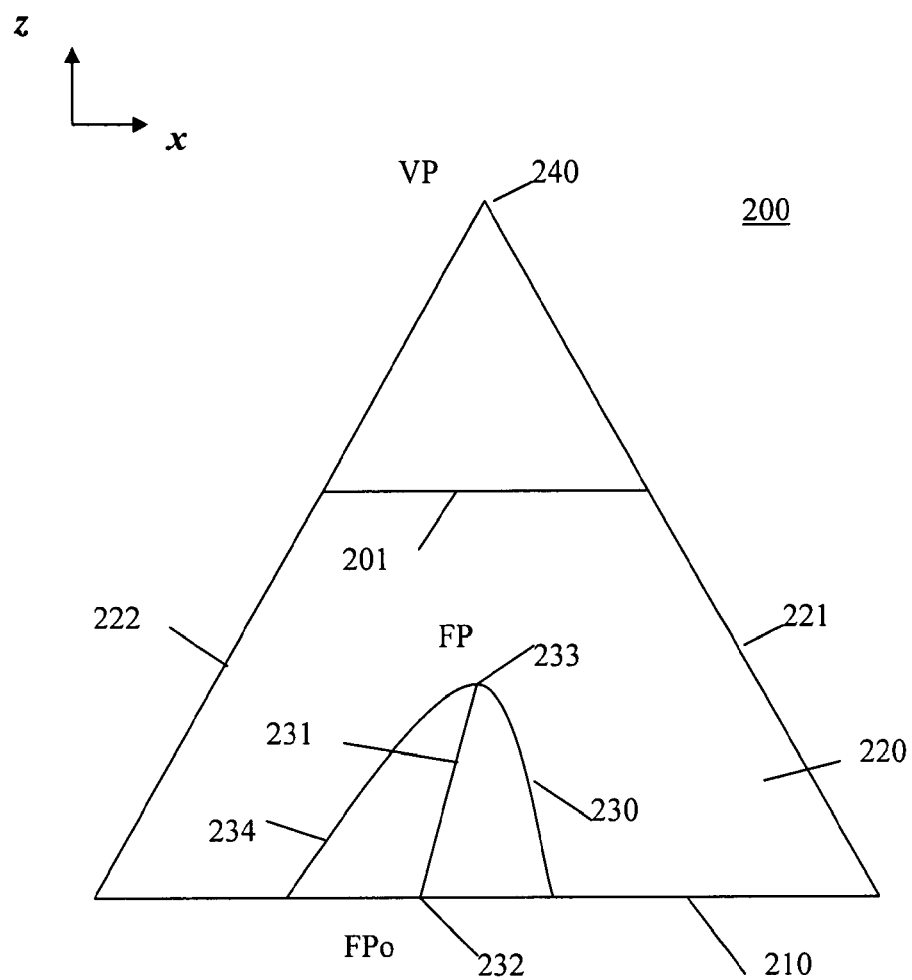
FIG. 2 is a graphical representation of the geometry of a presentation in accordance with elastic presentation space graphics technology.

FIG. 2 is a graphical representation 200 of the geometry of a presentation in accordance with EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

EPS is applicable to multidimensional data and is suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e., the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

System

Figure 3:
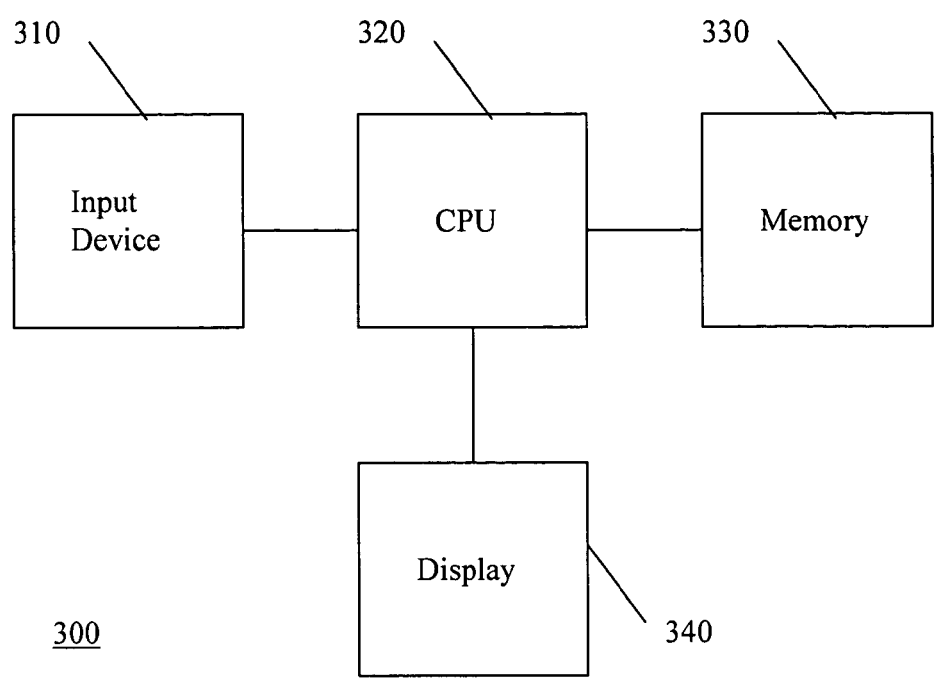
FIG. 3 is a block diagram illustrating a data processing system adapted for implementing an embodiment.

FIG. 3 is a block diagram of a data processing system 300 adapted to implement an embodiment. The data processing system is suitable for implementing EPS technology, for displaying detail-in-context presentations of representations, and for performing drag and drop ("DAD") operations in conjunction with a detail-in-context graphical user interface ("GUI") 400, as described below. The data processing system 300 includes an input device 310, a central processing unit or CPU 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware.

GUI with Lens Control Elements

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to DAD operations and to the control of detail-in-context data presentations. The software can be loaded into and run by the data processing system 300 of FIG. 3.

Figure 4:
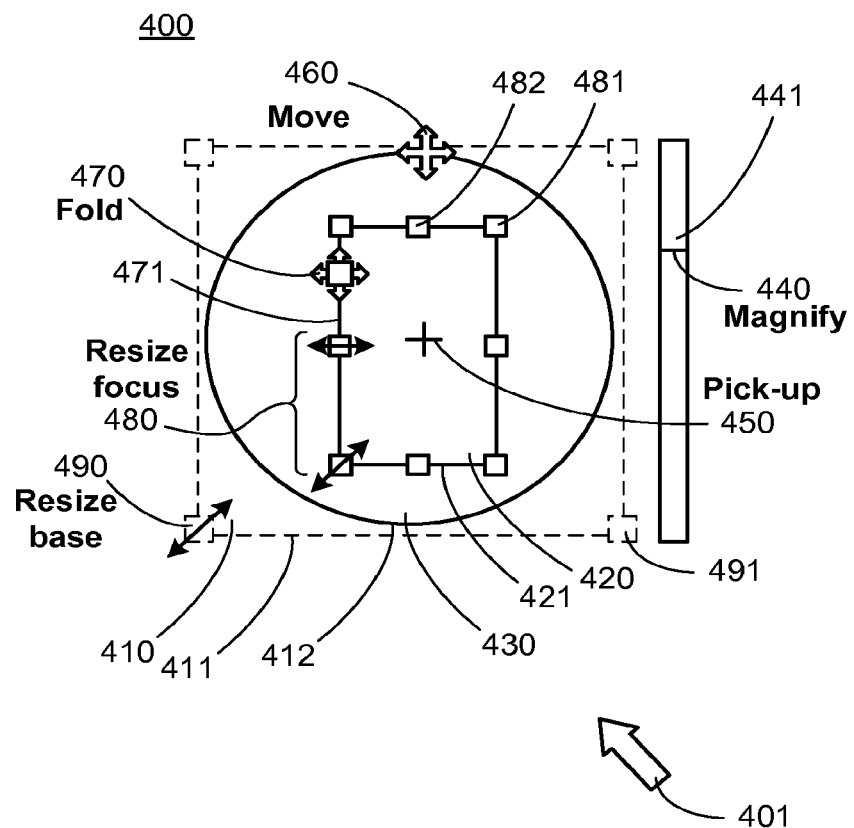
FIG. 4 a partial screen capture illustrating a GUI having lens control elements for user interaction with detail-in-context data presentations in accordance with an embodiment.

FIG. 4 is a partial screen capture illustrating a GUI 400 having lens control elements for user interaction with detail-in-context data presentations in accordance with an embodiment. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. For example, in FIG. 5, the lens 410 has a pyramid shape with a flat top 420 and trapezoidal shoulders 430. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e. dynamic interaction with a detail-in-context lens) is advantageous. At a given time, one or more of these lens control elements may be made visible to the user on the display surface 340 by appearing as overlay icons on the lens 410. Interaction with each element is performed via the motion of an input device (e.g., pointing device 310 such as a mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g., cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the techniques may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, a single mouse button may be used to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, 492 (see FIG. 5), magnify slide bar icon 440, and scoop slide bar icon 540 (see FIG. 5). Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491, 492 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491, 492. A bounding region may be provided having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 492, 440, 540. For example, when resizing the base 412 of a lens 410 using a corner handle 491, the cursor 401 will change form to a resize icon 490 once it is pointed at (i.e., positioned over) the corner handle 491. The cursor 401 will remain in the form of the resize icon 490 until the cursor 401 has been moved away from the corner handle 491.

Move

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 492, 440, 540. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 at the cursor location (e.g. near the centre of the lens 410). Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base

Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles 492 (see FIG. 5) will make the base 412 taller or shorter, wider or narrower. Resizing the base 412 by the corner handles 491 will keep the base 412 in proportion. Resizing the base 412 by the middle handles 492 will change the proportions of the base 412. That is, the middle handles 492 change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle 492 may include arrows indicating width resizing or height resizing. After pointing at the desired handle 491, 492, the user would click and drag the handle 491, 492 until the desired shape and size for the base 412 is reached. Once the desired shape and size are reached, the user would release the mouse button 310. The base 412 of the lens 410 is then locked in its new size and shape until a further base resize operation is performed.

Resize Focus

Resizing of the focal region 420 of a lens 410 is provided by the resize focus lens control element of the GUI. After the lens 410 is selected, a bounding rectangle icon 421 is displayed surrounding the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Scoop

The concavity or "scoop" of the shoulder region 430 of the lens 410 is provided by the scoop lens control element of the GUI. After the lens 410 is selected, the scoop control is presented to the user as a slide bar icon 540 (see FIG. 5) near or adjacent to the lens 410 and typically below the lens 410. Sliding the bar 541 of the slide bar 540 results in a proportional change in the concavity or scoop of the shoulder region 430 of the lens 410. The slide bar 540 not only informs the user that the shape of the shoulder region 430 of the lens 410 may be selected, but also provides the user with an indication as to what degree of shaping is possible.

The slide bar 540 includes a bar 541 that may be slid left and right, or up and down, to adjust and indicate the degree of scooping. To control the degree of scooping, the user would click on the bar 541 of the slide bar 540 and drag in the direction of desired scooping degree. Once the desired degree of scooping is reached, the user would release the mouse button 310. The lens 410 is then locked with the selected scoop until a further scooping operation is performed. Icon Hiding. Advantageously, a user may choose to hide one or more lens control icons 450, 412, 411, 421, 481, 482, 491, 492, 440, 540 shown in FIGS. 4 and 5 from view so as not to impede the user's view of the image within the lens 410. This may be helpful, for example, during a move or drag and drop operation. A user may select this option through means such as a menu or lens property dialog box.

GUI with Lens Control Elements and Attached Toolbar

Detail-in-context lenses may be used in a variety of applications. Using the GUI 400 described above, a user may change the manner in which information is displayed or presented. For example, the user may change the shape of the lens 410 (e.g. from pyramid shaped to cone shaped). Detail-in-context lens may also be used for editing applications. For example, a user may change the colour of a pixel, or add a label to source data, using a detail-in-context lens as a selection device. Detail-in-context lens may be used for more complex editing applications such as DAD operations as will be described in more detail below. Such detail-in-context lens applications or modes may be chosen by a user via keyboard commands, pull-down menu, or toolbar.

Figure 5:
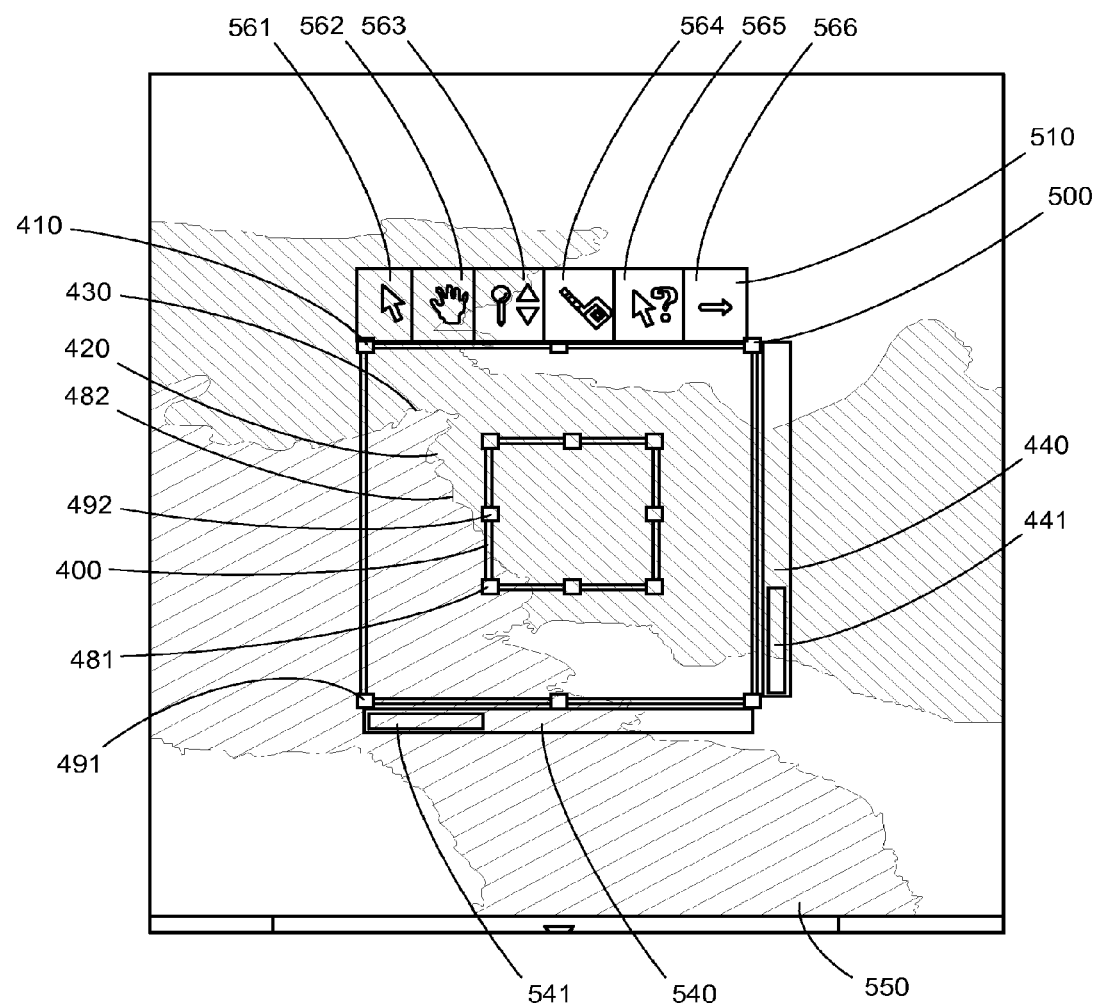
FIG. 5 is a screen capture illustrating a GUI having lens control elements and an attached horizontal toolbar for user interaction with a detail-in-context data presentation in accordance with an embodiment.

FIG. 5 is a screen capture illustrating a GUI 500 having lens control elements and an attached horizontal toolbar 510 for user interaction with a detail-in-context data presentation 550 in accordance with an embodiment. In FIG. 5, the toolbar 510 is located above the lens 410. The toolbar 510 includes a number of icons 561, 562, 563, 564, 565, 566 for selecting an application for the lens 410 and/or for providing related functions. In FIG. 5, the toolbar 510 includes a pointer icon 561 for selecting points in the presentation 550 using the lens 410, a hand tool icon 562 for selecting a view area for the presentation 550, a zoom tool icon 563 for zooming into or away from the region-of-interest 420 or presentation 550 (see the Applicant's co-pending Canadian Patent Application No. 2,350,342, which is incorporated herein by reference), a measuring tool icon 564 for initiating a measurement operation (see the Applicant's co-pending Canadian Patent Application Nos. 2,393,708 and 2,394,119, which are incorporated herein by reference), a help tool icon 565 for initiating a user help function as is known in the art, and a continuation arrow icon 566 for indicating the existence of and scrolling additional toolbar icons into view.

Figure 6:
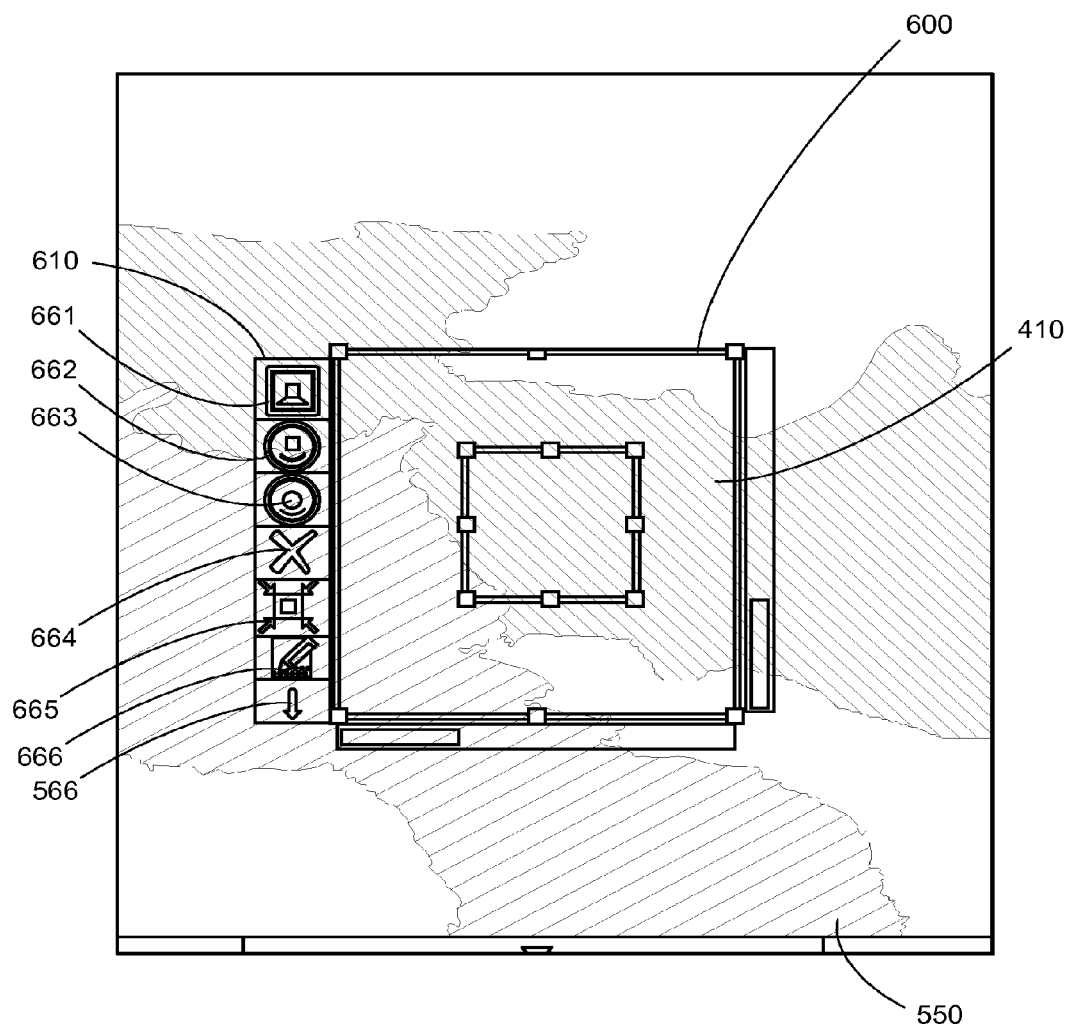
FIG. 6 is a screen capture illustrating a GUI having lens control elements and an attached vertical toolbar for user interaction with a detail-in-context data presentation in accordance with an embodiment.

FIG. 6 is a screen capture illustrating a GUI 600 having lens control elements and an attached vertical toolbar 610 for user interaction with a detail-in-context data presentation 550 in accordance with an embodiment. In FIG. 6, the toolbar 610 is located at the side of the lens 410. Again, the toolbar 610 includes a number of icons 661, 662, 663, 664, 665, 666, 566 for selecting an application for the lens 410 and/or for providing related functions. The toolbar 610 includes a pyramid lens icon 661 for choosing a pyramid shaped lens 410, a circular based lens icon 662 for choosing a lens 410 with a circular base 412, a circular focus icon 663 for choosing a lens 410 with a circular shaped focus 420, a delete icon 664 for deleting a lens from the presentation 550, and the continuation arrow icon 566 for indicating the existence of and scrolling additional toolbar icons into view. Additional icons 665, 666 may be included for additional functions, as needed, or may be included as reduced-sized representations of the data or objects to be copied, cut, or placed.

Figure 7:
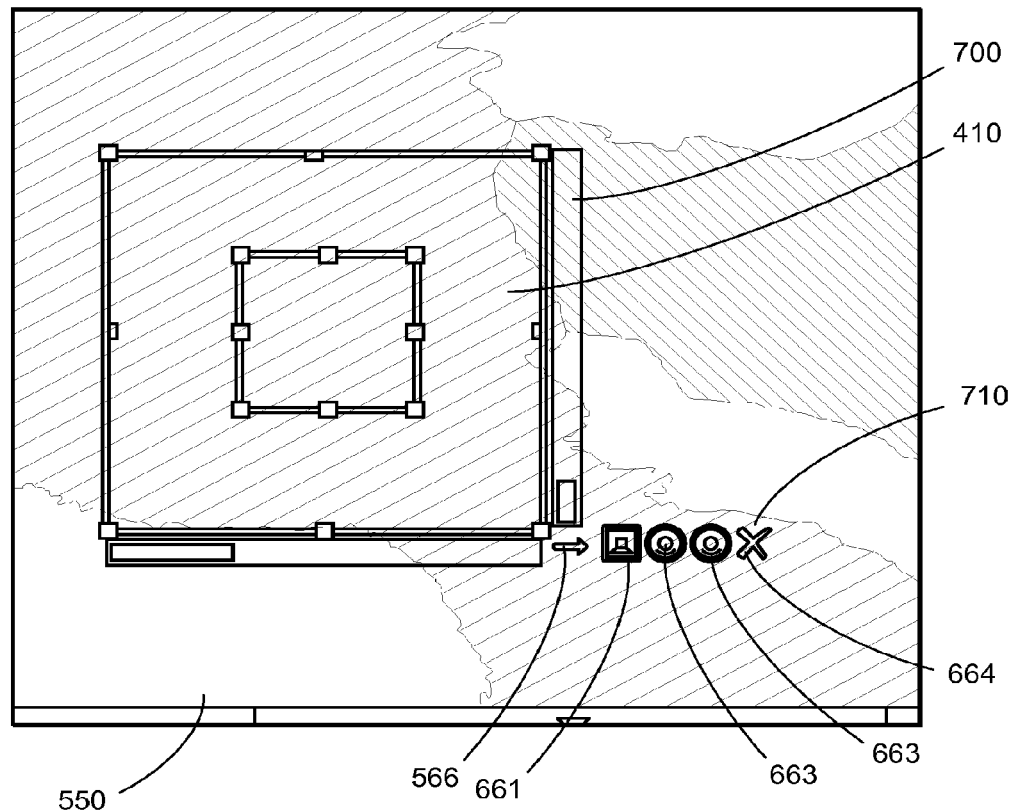
FIG. 7 is a screen capture illustrating a GUI having lens control elements and an attached corner toolbar for user interaction with a detail-in-context data presentation in accordance with an embodiment.

FIG. 7 is a screen capture illustrating a GUI 700 having lens control elements and an attached corner toolbar 710 for user interaction with a detail-in-context data presentation 550 in accordance with an embodiment. In FIG. 7, the toolbar 710 is located at a corner of the lens 410. Again, the toolbar 710 includes a number of icons 661, 662, 663, 664, 566 for selecting an application for the lens 410 and/or for providing related functions. The toolbar 710 includes a pyramid lens icon 661 for choosing a pyramid shaped lens 410, a circular based lens icon 662 for choosing a lens 410 with a circular base 412, a circular focus icon 663 for choosing a lens 410 with a circular shaped focus 420, a delete icon 664 for deleting a lens from the presentation 550, and the continuation arrow icon 566 for indicating the existence of and scrolling additional toolbar icons into view.

By attaching the toolbar 510, 610, 710 to the lens GUI 400, the controls available through the toolbar 510, 610, 710 are made more easily accessible to a user. As the lens 410 and GUI 500, 600, 700 move, the toolbar 510 610, 710 moves with them allowing the user easy access to alternate lens applications as the user homes-in on a region-of-interest 420 in a presentation 550. In this way, if the user decides to change lens applications, the toolbar 510, 610, 710 is exactly where the user expects it, that is, near the lens 410.

According to an embodiment, the toolbar 510, 610, 710 is not constantly visible. An icon, for example the continuation arrow icon 566, may be used to toggle the visibility of the toolbar 510, 610, 710 on and off. Alternatively, the toolbar 510, 610, 710 may be transparent along with the rest of the GUI 500, 600, 700 as illustrated in FIGS. 5, 6, and 7. According to another embodiment, the toolbar 510, 610, 710 need not be docked or attached to the lens 410 at all times. Rather, an icon (not shown) on the toolbar 510, 610, 710 may be clicked to toggle the toolbar from a docked to a floating state. According to another embodiment, the toolbar 510, 610, 710 or its icons may be resized. For example, the toolbar icons 561, 562, 563, 564, 565, 566 may be presented at a larger size as the user directs the cursor 401 toward them. According to another embodiment, the position of the toolbar 510, 610, 710 may vary with the position of the lens 410 on the display screen 340. For example, if a presentation 550 has a lens 410 positioned at the top-left corner of the screen 340, then the toolbar 710 may be automatically presented at the bottom-right corner of the lens 410 as shown in FIG. 7. According to another embodiment, an icon (not shown) on the toolbar 510, 610, 710 may be clicked to toggle the location of the toolbar about the lens 410. According to another embodiment, the toolbar 510, 610, 710 may be manually or automatically resized. According to another embodiment, the toolbar icons may represent applications that are currently running. By clicking on a toolbar icon, the user is able to switch from a first application to another from within the first application. According to another embodiment, the toolbar icons may be used to indicate the status of applications that are currently running. For example, a printer icon 861 (see FIG. 8) may indicate that printing is in progress. Another icon (not shown) may indicate that retrieving of high resolution data through the lens 410 is in progress.

Figure 8:
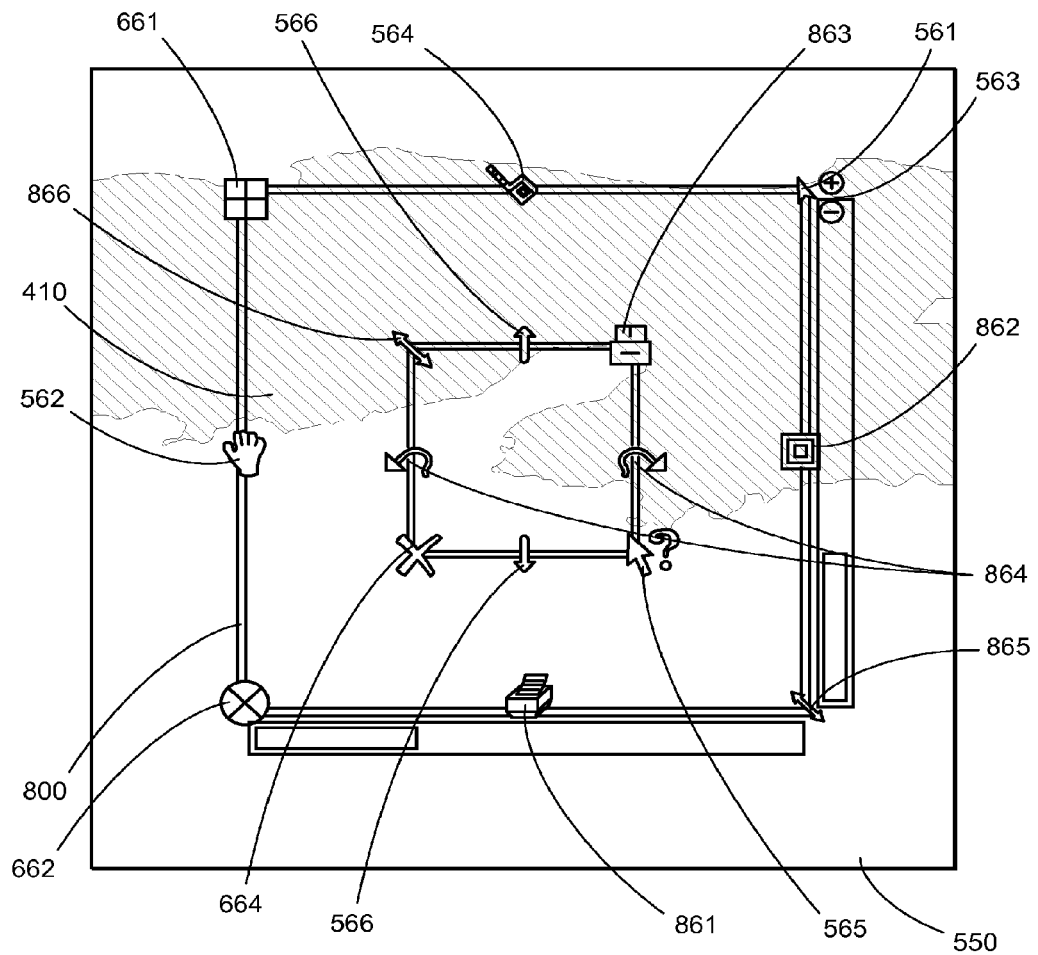
FIG. 8 is a screen capture illustrating a GUI having toolbar icons placed over base and focus resize handle icons for user interaction with a detail-in-context data presentation in accordance with an embodiment.

FIG. 8 is a screen capture illustrating a GUI 800 having toolbar icons 561, 562, 563, 564, 565, 566, 661, 662, 664, 861, 862, 863, 864, 865, 866 placed over base and focus resize handle icons 481, 482, 491, 492 for user interaction with a detail-in-context data presentation 550 in accordance with an embodiment. The GUI 800 includes a number of toolbar icons for selecting an application for the lens 410 and/or for providing related functions. The toolbar icons include a printer icon 861 for selecting or indicating the status of a print application, a floppy disk icon 863 for selecting or indicating the status of a save application, redo/undo icons 846 for selecting redo and undo applications, a resize base icon 865 for selecting a predefined base resizing application, and a resize focus icon 866 for selecting a predefined focus resizing operation. An additional icon 862 may be included for an additional function, as needed, or may be included as a reduced-sized representation of the data or objects to be copied, cut, or placed. According to one embodiment, the toolbar icons may be distributed along the bounding rectangles 411, 421 of the base 412 and focus 420 of the lens 410 rather than being placed over the base and focus resize handle icons 481, 482, 491, 492. According to another embodiment, an icon (not shown) may be clicked to toggle the location of the toolbar icons from over the base and focus resize handle icons 481, 482, 491, 492 to a toolbar 510, 610, 710 located adjacent to the lens 410. Advantageously, by placing toolbar icons 561, 562, 563, 564, 565, 566, 661, 662, 664, 861, 862, 863, 864, 865, 866 over base and focus resize handle icons 481, 482, 491, 492, the visibility of the presentation 550 to the user may be improved for some applications. Again, other icons may be added to represent other functions or to represent data to be cut, copied, or placed.

Dragging and Dropping with Detail-in-Context Lenses

Detail-in-context data viewing techniques may be applied to DAD operations in digital image presentations. Detail-in-context data viewing techniques allow a user to view multiple levels of detail or resolution on one display 340. The appearance of the data display or presentation is that of one or more virtual lens showing detail 233 within the context of a larger area view 210. Thus, detail-in-context lenses may be used to perform accurate DAD operations.

Figure 9:
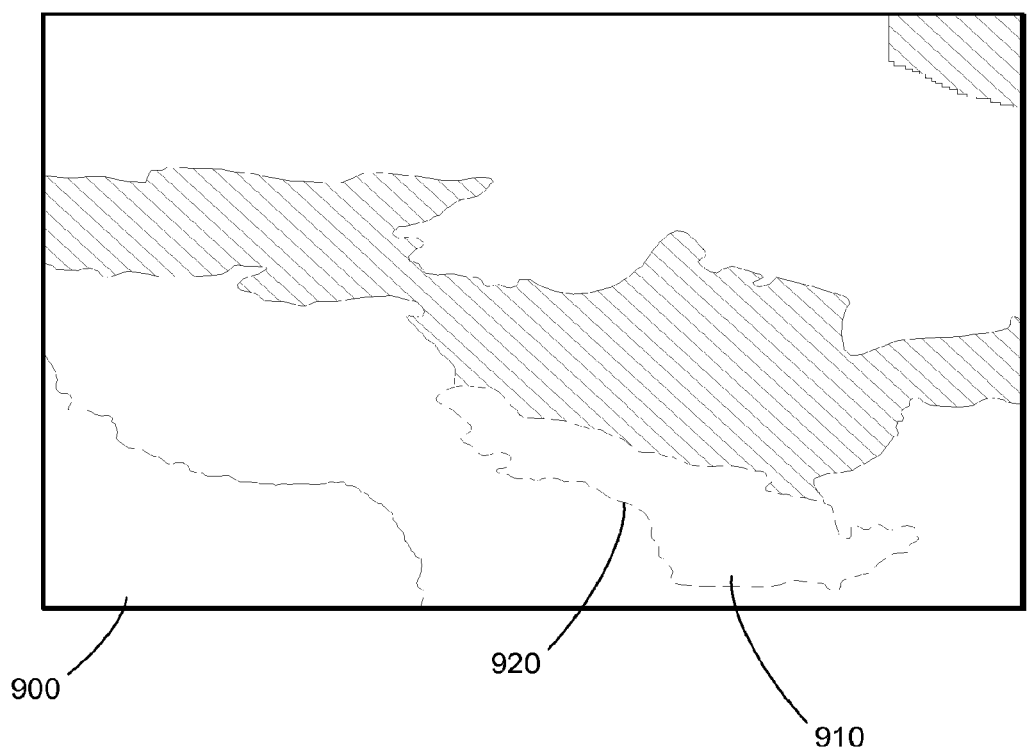
FIG. 9 is a screen capture illustrating a selected object in an original image in accordance with an embodiment.

As mentioned above, a user typically interacts with a GUI by using a pointing device (e.g., a mouse) 310 to position a pointer or cursor 401 over an object and "clicking" on the object. FIG. 9 is a screen capture illustrating such an object 910 in an original image 900 in accordance with an embodiment. Thus, a drag and drop ("DAD") operation may be initiated by selection from a toolbar 510, 610, 710, 810 or by selecting an object 910 within an original image 900. The pointing device (e.g. mouse) 310 is used to select an object 910 (e.g., text, icons, graphical objects, etc.) under a cursor 401 and then "drag" the selected object 910 to a different location or orientation on a display screen 340. The user may then "drop" or release the object 910 at a desired new location or orientation indicated by the position of the cursor 401. Selecting may be initiated by holding down a button associated with the pointing device (e.g., a mouse button) 310 and gesturing with the pointing device 310 to indicate the bounds of the object 910 to be selected (as in text selection), or simply by "clicking" on the object 910 under the cursor 401 (as in graphical image or icon selection). Selection may be indicated by a change in the visual display of the selected object 910 (e.g., by using reverse video, displaying a frame around the object, displaying selection handles around the object, etc.). In FIG. 9, the selection of the object 910 is indicated by a dashed line 920 bounding the object 910.

Figure 10:
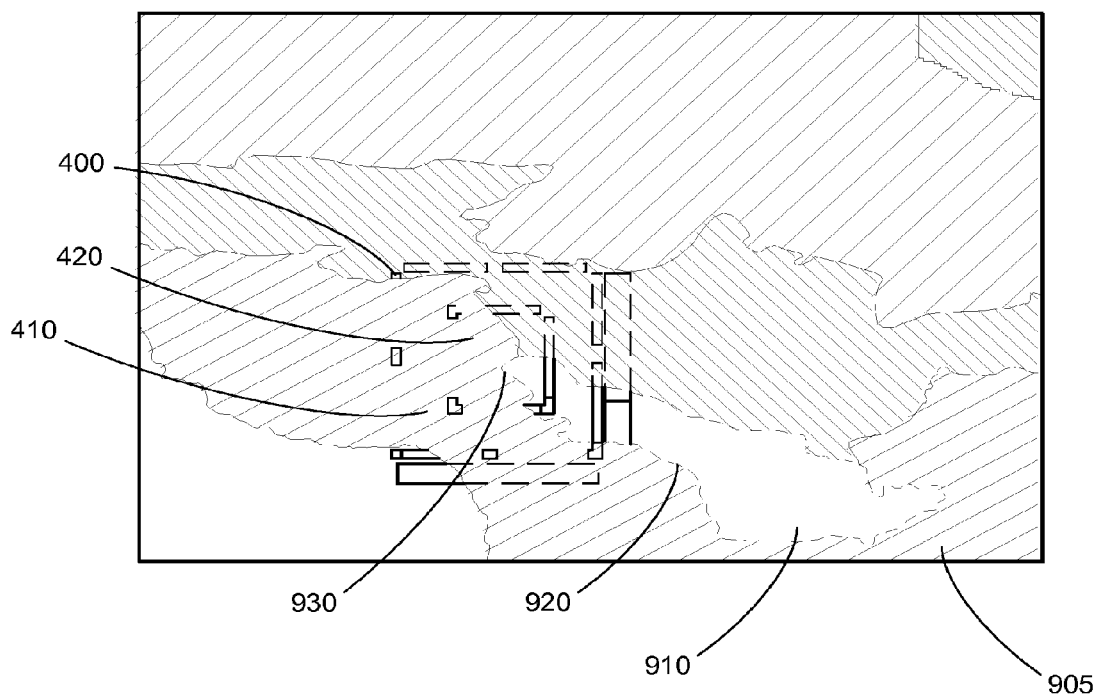
FIG. 10 is a screen capture illustrating the attachment of a lens to a selected object to produce a detail-in-context presentation in accordance with an embodiment.

Once an object 910 is selected, a lens 410 is attached to the object 910. Any point on the selected object 910 may be chosen to be in the centre of the lens focus 420. FIG. 10 is a screen capture illustrating the attachment of a lens 410 to a selected object 910 to produce a detail-in-context presentation 905 in accordance with an embodiment. In FIG. 10, the centre of the focus 420 of the lens 410 is attached at any point 930 (e.g. an end point) of the object 910. The lens 410 may be configured using its associated GUI 400 in the manner described above. That is, the shape, size, magnification, scoop, and fold for the lens 410 may all be carefully tuned for the selected object 910. The lens 410 may be configured before attachment to the selected object 910 or after attachment. In addition, the lens 410 may be displayed before the object 910 is selected to aid in the selection of the object 910.

Figure 11:
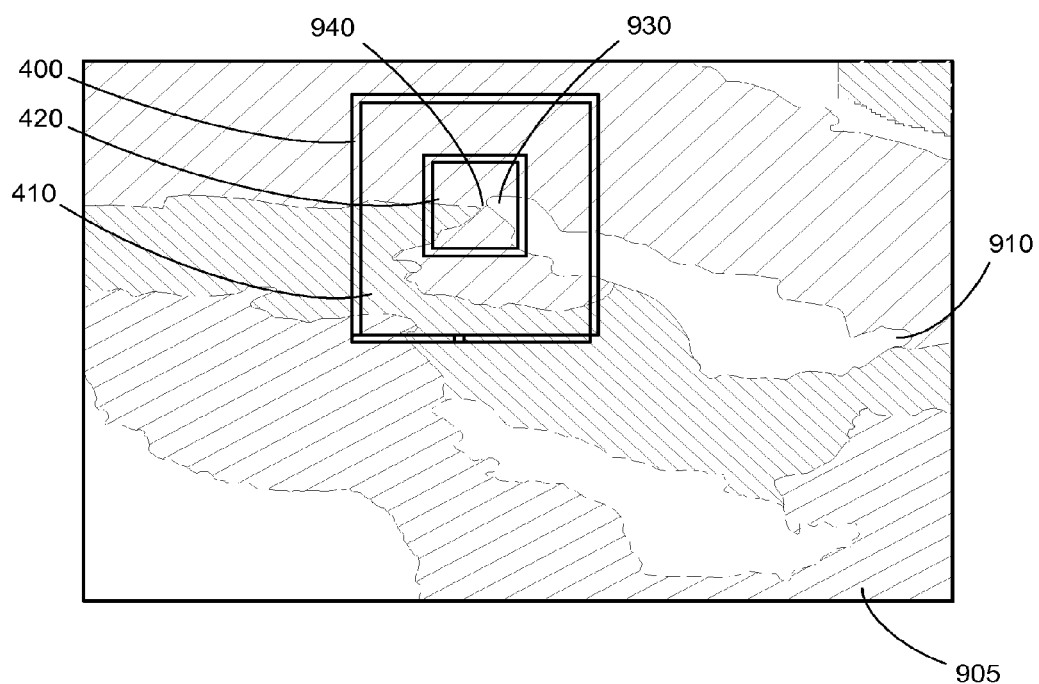
FIG. 11 is a screen capture illustrating a drop and drag operation for a detail-in-context presentation in accordance with an embodiment.

FIG. 11 is a screen capture illustrating a drop and drag operation for a detail-in-context presentation 905 in accordance with an embodiment. Having selected and attached a lens 410 to the object 910, the object 910 may now be dragged to its new location 940. Dragging may be a separate step distinct from selection and attachment, and may be initiated by clicking on the selected object 910 and depressing a mouse 310 control button. The object 910 is then dragged from its original position 930 to its new position 940 while holding the control button down. As the object 910 moves, the lens 410 moves with it. Alternatively, the lens 410 may be thought of as carrying the object 910, that is, the object 910 may be attached to the lens 410 such that as the lens 410 moves, the object 910 moves with it. In an alternative embodiment, initiating dragging also selects the object 910 under the cursor 401 and attaches a lens 410 to it. In another embodiment, selecting the object 910 attaches a lens 410 and initiates dragging. The DAD operation is completed by dropping the selected object 910 at its new location 940. That is, releasing the mouse button when a selected point on the object 930 is aligned with a desired point 940 at the new location.

Advantageously, since the magnification at the focus 420 of the lens 410 is greater than that at the base of the lens 410, dragging the lens 410 with the selected object 910 makes it easier for a user to align a point 930 on the selected object 910 with a point 940 at the new location for the object in the presentation 905. For example, the magnification in the focus 420 may be set to pixel level resolution using the magnification slide bar icon 440. As the lens 410 with its selected object 910 moves to the new location 940, the region around the new location 940 is magnified to the same high resolution. As a result, the accuracy of aligning the point 930 on the selected object 910 to a desired point 940 at the new location is improved. In addition, the user is assisted throughout this DAD operation by being able to observe the detail in the lens focus 420 in the context of the surrounding presentation 900. Finally, once the points 930, 940 are aligned, the object 910 may be dropped from the lens 410 into its new position.

In operation, the data processing system 300 employs EPS techniques with an input device 310 and GUI 500, 600, 700, 800 for selecting an object 910 and points 930, 940 to perform a DAD operation for display to a user on a display screen 340. Data representing an original image 900 or representation is received by the CPU 320 of the data processing system 300. Using EPS techniques, the CPU 320 processes the data in accordance with instructions received from the user via an input device 310 and GUI 500, 600, 700, 800 to produce a detail-in-context presentation 905. The presentation 905 is presented to the user on a display screen 340. It will be understood that the CPU 320 may apply a transformation to the shoulder region 430 surrounding the region-of-interest 420 to affect blending or folding in accordance with EPS technology. For example, the transformation may map the region-of-interest 420 and/or shoulder region 430 to a pre-defined lens surface, defined by a transformation or distortion function and having a variety of shapes, using EPS techniques. Or, the lens 410 may be simply coextensive with the region-of-interest 420. (Blending and folding of lenses in detail-in-context presentations are described in U.S. patent application Publication No. 2002/0044154 which is incorporated herein by reference.)

The lens control elements of the GUI 500, 600, 700, 800 are adjusted by the user via an input device 310 to control the characteristics of the lens 410 in the detail-in-context presentation 905. Using an input device 310 such as a mouse, a user adjusts parameters of the lens 410 using icons and scroll bars of the GUI 500, 600, 700, 800 that are displayed over the lens on the display screen 340. The user may also adjust parameters of the image of the full scene 905. Signals representing input device 310 movements and selections are transmitted to the CPU 320 of the data processing system 300 where they are translated into instructions for lens control.

In FIG. 9, the dashed line 920 indicates the object 910 selected for the DAD operation. In FIG. 10, by moving the lens 410 on the display screen 340 with the lens GUI 500, 600, 700, 800, the user can locate the focus 420 of the lens 410 over a selected point 930 on the object 910 in the presentation 905. In FIG. 11, observing the points 930, 940 within the focus 420 of the lens 410 as the user drags the object 910, the user can decide whether or not the current position of the object 910 is desirable. If the user is satisfied with the current position, the user may drop the object 910. If the user is dissatisfied with the current position of the object 910, then the object may be dragged to a new position. Advantageously, by using a detail-in-context lens 410 to select an object 910 or points 930, 940 defining a DAD operation, a user can view a large area 905 (i.e. outside the lens 410) while focusing in on a smaller area 420 (i.e. inside the focal region 420 of the lens 410) surrounding the selected object 910 or points 930, 940. This makes it possible for a user to perform an accurate DAD operation without losing visibility or context of the portion of the original image surrounding the selected object 910.

Moreover, the lens 410 may be added to the presentation 900 before or after the object 910 is selected. That is, the user may first add a lens 410 to a presentation 900 or the user may move a pre-existing lens into place at, say, a selected point 930 on an object 910. The lens 410 may be introduced to the original image 900 to form the presentation 905 through the use of a pull-down menu selection, tool bar icon, etc. The DAD operation may then be activated using a toolbar selection or with a double click on the selected object 910. Now, as the select object 910 is dragged to its new location or point 940, the lens 410 is presented over and moves with the selected point 930 on the object 910. Again, this facilitates the accurate selection of the new position or point 940 defining the DAD operation.

The object 910 may consist of raster-based or vector-based data. In the case of vector-based data, a vector object 910 is attached to the lens 410 and may be aligned with other vector or raster data. The object 910 may also consist of text data which may be attached to the lens 410 and dragged to a new location in the presentation 905. Other objects 910 such as icons and 3-D objects may also be attached and dragged with the lens 410. For example, an icon representing a file or an application may be attached to the lens 410 and then dragged to the recycle bin for disposal. Or, a 3-D object such as a chair may be carried by the lens 410 and moved to a new location 940.

A number of pre-configured lenses 410 with or without attached objects 910 may be saved in the memory 330 of the system 300 for subsequent use. These lenses and objects may be saved in a general toolbar, in a lens toolbar 510, 610, 710, 810, or as a list of bookmarks in a pull-down menu and may be subsequently recalled and pasted into a presentation 905. In addition, pre-configured lenses 410 may be assigned names by a user. According to one embodiment, a lens 410 may be saved with more than one object 910 attached to it. In this embodiment, when the lens is moved, all of the attached objects move with it.

As described in the Applicant's co-pending Canadian Patent Application Nos. 2,393,708 and 2,394,119, referred to above, detail-in-context lens may be used for cropping an original image. Similarly, and in accordance with an embodiment, the shape of a lens 410 applied to an original image 900 may be used to define a selection or "cut" from the original image. Lenses may be formed as squares, circles, or other shapes and these may be modified on the fly using the GUIs described above to form new shapes. A newly shaped lens may then be used as a "cookie cutter" or copier to cut, move (i.e. drag and drop as described above), and paste objects into a current presentation 905 or a new presentation. After performing a lens shaped cut, the lens may be extended out beyond the bounds of the cut area to allow improved detail-in-context viewing and DAD operation. Moreover, if the original image includes multiple layers or is three-dimensional, then the cut may also include data from the different layers. That is, the cut may be multi-layer or multi-dimensional. In addition, the lens GUI may include a cut depth control slide bar icon or the like for specifying cut depth.

The techniques may be used in photo kiosk applications. In general, a photo kiosk is specialized workstation connected to high quality printers for processing and printing digital photographic images, typically for a fee paid by the user. Photo kiosks typically have touch-sensitive screens ("touch-screens") for user input. The GUIs described above may be advantageously used in photo kiosks to facilitate user editing of digital images. For example, the lens extent handles 491, 492 and focus handles 481, 482 can be used to select the region or regions of a displayed photo which are to be printed or otherwise processed, and then the attached toolbar 510, 610, 710, 810 can be used to select a processing or printing operation to be performed. In one embodiment, the lens extent and focus handles 491, 491, 481, 482 can be overlaid with icons representing the status of a selected operation (e.g. printing, copying, or other processing of the image or of a part of the image). Moreover, the DAD operations described above can be used for adding images (e.g. flowers, hearts, text, background images, "Clipart", etc.) to an original image with enhanced placement accuracy.

Method

Figure 12:
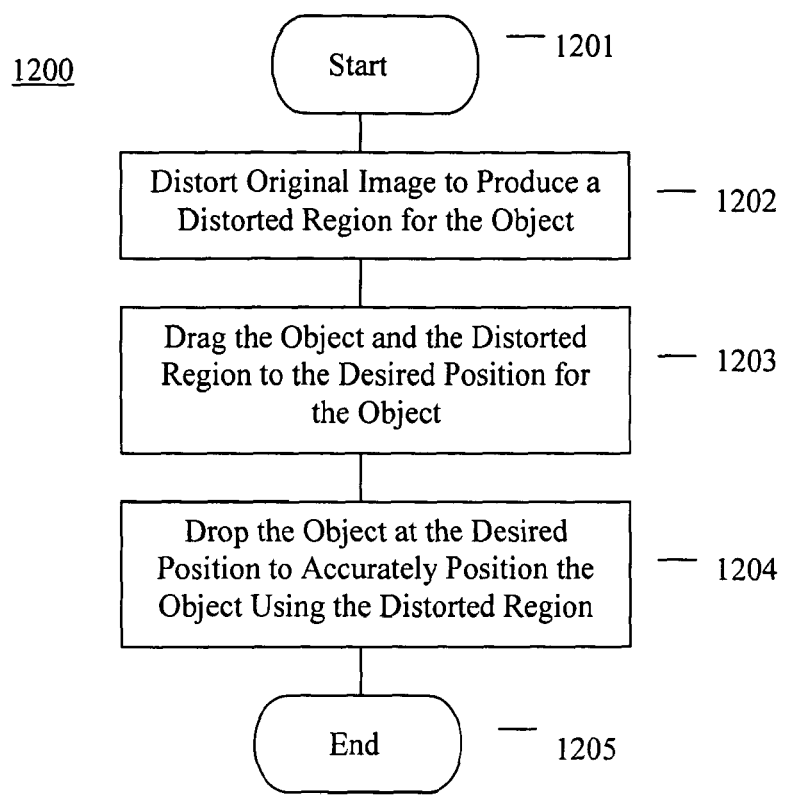
FIG. 12 is a flow chart illustrating a method for positioning a selected object in a computer generated original image on a display in accordance with an embodiment.

FIG. 12 is a flow chart 1200 illustrating a method for positioning a selected object 910 in a computer generated original image 900 on a display 340 in accordance with an embodiment.

At block 1201, the method starts.

At block 1202, the original image 900 is distorted to produce a distorted region 410 for the object 910. This step of distorting may further includes the steps of: creating a lens surface for the distorted region 410; and, transforming the original image 900 by applying a distortion function defining the lens surface to the original image 900. The step of creating may further include the step of displaying a GUI 400, 500, 600, 700, 800 over the distorted region 410 for adjusting the lens surface.

At block 1203, the object 910 and the distorted region 410 are dragged to a desired position 940.

At block 1204, the object 910 is dropped at the desired position 940. By using the distorted region 410, the object 910 is accurately positioned.

At block 1205, the method ends.

Data Carrier Product

The sequences of instructions which when executed cause the method described herein to be performed by the exemplary data processing system of FIG. 3 can be contained in a data carrier product according to one embodiment. This data carrier product can be loaded into and run by the exemplary data processing system of FIG. 3.

Computer Software Product

The sequences of instructions which when executed cause the method described herein to be performed by the exemplary data processing system of FIG. 3 can be contained in a computer software product according to one embodiment. This computer software product can be loaded into and run by the exemplary data processing system of FIG. 3.

Integrated Circuit Product

The sequences of instructions which when executed cause the method described herein to be performed by the exemplary data processing system of FIG. 3 can be contained in an integrated circuit product including a coprocessor or memory according to one embodiment. This integrated circuit product can be installed in the exemplary data processing system of FIG. 3.

Although embodiments of the invention have been described herein, it will be understood by those skilled in the art that variations may be made thereto without departing from the spirit of the invention or the scope of the appended claims.

What is claimed is:

1. A method comprising:
   receiving an object selection signal to select an object in an image, wherein the object is moveable within the image;
   in response to said receiving an object selection signal, selecting the object;
   subsequent to said selecting the object and while the object is selected:
      changing an appearance of the object to indicate that it is selected, and
      attaching a lens to the object;
   receiving a drag signal to drag the object and the lens from a first position to a second position;
   dragging the object together with the lens from the first position to the second position;
   receiving a drop signal to drop the object at the second position; and
   wherein the lens magnifies a portion of the object and a portion of the image outside of the object.

2. The method of claim 1, further comprising:
   in response to said receiving a drag signal, dragging the object and the lens from the first position to the second position; and
   in response to said receiving a drop signal, dropping the object at the second position.

3. The method of claim 1, wherein the lens comprises:
   an extent of the lens;
   a focal region including a magnification, wherein the focal region magnifies at least a portion of the object and a portion of the image outside of the object;
   a shoulder region between the extent of the lens and the focal region; and
   wherein the shoulder region provides context for the focal region with respect to a portion of the image outside of the extent of the lens by preserving visibility of information surrounding the focal region.

4. The method of claim 3, further comprising displaying, together with the lens, a graphical user interface ("GUI") including at least one of:
   a slide bar icon for adjusting the magnification for the focal region;
   a slide bar icon for adjusting a degree of scooping for the lens;
   a bounding rectangle icon with at least one handle icon for adjusting a size and a shape of the focal region;
   a bounding rectangle icon with at least one handle icon for adjusting a size and a shape of the extent of the lens;
   a move icon for adjusting a position of the lens within the image; or
   a fold icon for adjusting a position of the focal region relative to the extent of the lens.

5. At least one non-transitory computer-readable storage device including instructions for execution on one or more processors, wherein the instructions comprise instructions for:
   receiving an object selection signal to select an object in an image, wherein the object is moveable within the image;
   in response to said receiving an object selection signal, selecting the object;
   subsequent to said selecting the object and while the object is selected:
      changing an appearance of the object to indicate that it is selected, and
      attaching a lens to the object;
   receiving a drag signal to drag the object and the lens from a first position to a second position;
   dragging the object together with the lens from the first position to the second position;
   receiving a drop signal to drop the object at the second position; and
   wherein the lens magnifies a portion of the object and a portion of the image outside of the object.

6. The at least one non-transitory computer-readable storage device of claim 5, wherein the instructions further comprise instructions for:
   in response to said receiving a drag signal, dragging the object and the lens from the first position to the second position; and
   in response to said receiving a drop signal, dropping the object at the second position.

7. The at least one non-transitory computer-readable storage device of claim 5, wherein the lens comprises:
   an extent of the lens;

a focal region including a magnification, wherein the focal region magnifies at least a portion of the object and a portion of the image outside of the object;

a shoulder region between the extent of the lens and the focal region; and wherein the shoulder region provides context for the focal region with respect to a portion of the image outside of the extent of the lens by preserving visibility of information surrounding the focal region.

8. The at least one non-transitory computer-readable storage device of claim 7, wherein the instructions further comprise instructions for:

displaying, together with the lens, a graphical user interface ("GUI") including at least one of:

a slide bar icon for adjusting the magnification for the focal region;

a slide bar icon for adjusting a degree of scooping for the lens;

a bounding rectangle icon with at least one handle icon for adjusting a size and a shape of the focal region;

a bounding rectangle icon with at least one handle icon for adjusting a size and a shape of the extent of the lens;

a move icon for adjusting a position of the lens within the image; and a fold icon for adjusting a position of the focal region relative to the extent of the lens.

\* \* \* \* \*